2,553,474

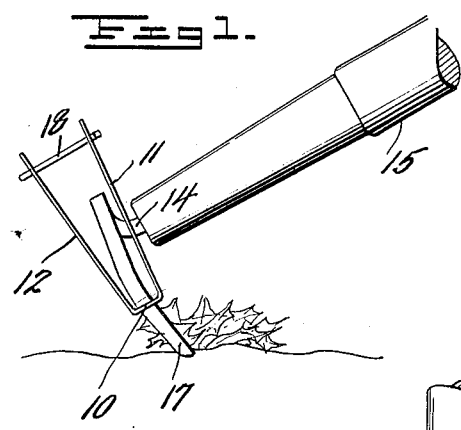
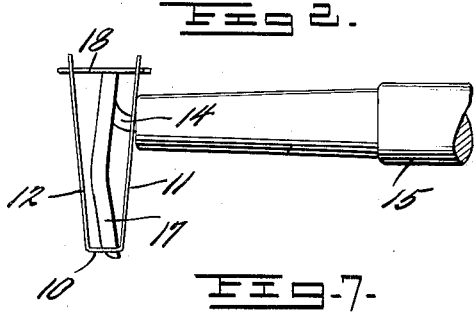
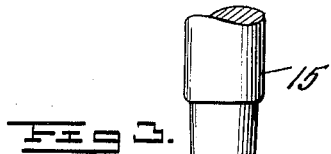
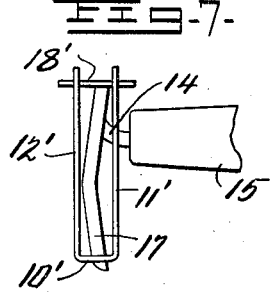
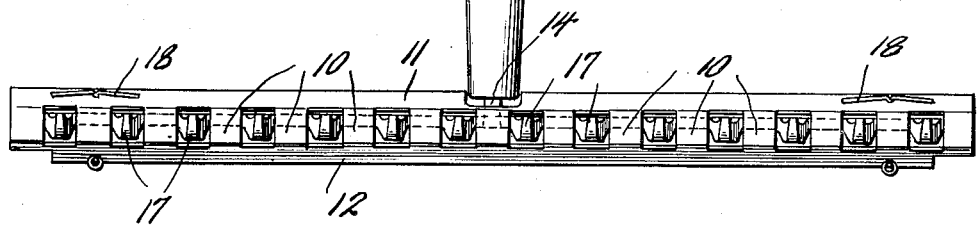
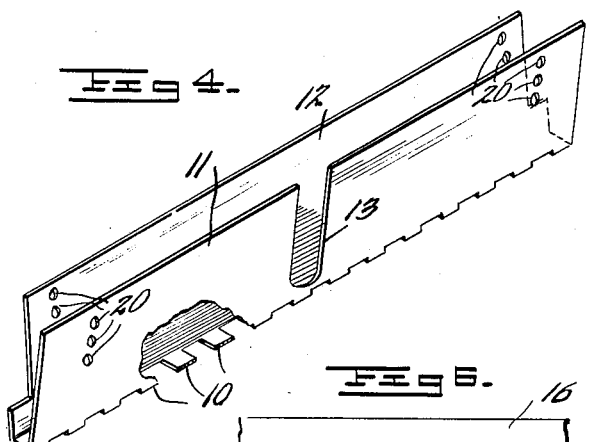
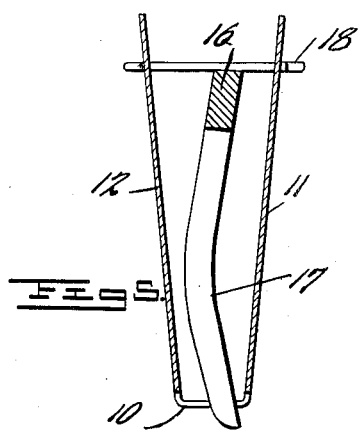
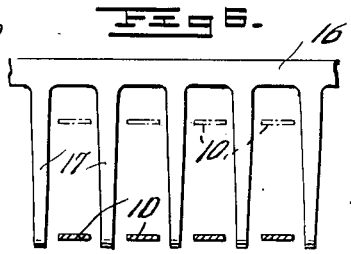
INVENTOR.
HASKELL SMITH RHETT,
BY Watson, Cole, Grindle & Watson,
ATTORNEYS Patented May 15, 1951

UNITED STATES PATENT OFFICE 2,553,474

ATTACHMENT FOR RAKES

Haskell Smith Rhett, Wilmington, Calif.

Application May 17, 1949, Serial No. 93,783

3 Claims. (Cl. 56—400.08)

The present invention relates to attachments for rakes and particularly to an attachment for a hand rake of the type commonly utilized in raking lawns and gardens.

It has heretofore been proposed that the operation of the ordinary lawn or garden rake might be improved by utilizing in association therewith an attachment designed and intended to maintain the interdental spaces of the rake free and unclogged. It is common knowledge that the efficiency of the usual garden rake is greatly lowered when the spaces between the teeth of the rake become obstructed by stones, sticks, or other objects and it has been heretofore suggested that a device or attachment primarily intended to perform cleaning functions may with advantage be mounted upon the head of a rake in such manner that it may move relatively to the rake head and teeth and function to remove from between the teeth any objects which have been caught between or picked up by the teeth of the rake. Various types of these rake cleaning attachments have been suggested or proposed but, for one reason or another, have not been made practically available.

It is the purpose of the present invention to provide a rake head attachment of improved design, simpler than those heretofore proposed, more effective in performing its intended functions, and which may be manufactured easily and at small expense. Essentially the attachment comprises a plurality of elements disposed in the spaces between the teeth of the rake, one such element being located between each two adjacent teeth, together with means for supporting these elements in such manner that they may move longitudinally of the teeth from a position adjacent the common member from which all of the teeth spring to a position closely adjacent the outer ends or points of the teeth. Each of these elements, in moving from its innermost to its outermost position, will dislodge articles caught and held by the teeth between which it acts and the attachment is of such nature that all of the cleaning elements move in unison so that by a single operation of the attachment as an entirety all of the interdental spaces of the rake may be cleared at one time.

The elements described are preferably fabricated of sheet metal and rectangular in shape so as to have a substantial bearing area. Each is made as wide as may be without too closely approaching the teeth of the rake. Preferably the attachment comprises a single piece of sheet metal having two panels disposed at an acute angle, a forward panel and a rear panel, each of these two panels being substantially co-extensive in area with the head of the rake and the several interdental cleaning elements being integral with both panels, these elements bridging and connecting adjacent edges of such panels. By a single stamping operation, followed by bending, a cleaning attachment may be quickly fabricated from a sheet of metal and, inasmuch as the forward and rear panels of the attachment diverge, a series of the attachments may be nested together for convenience in storage and shipment. The invention may be varied in minor respects in adapting it to rakes having different characteristics and one form thereof which has proven to be thoroughly effective in actual use is illustrated in the accompanying drawings by way of example.

In the drawings:

Figure 1 is an end elevation of the head of a hand rake and the attachment which has been applied thereto, the rake being illustrated in contact with the ground and the attachment having moved to an upper position to permit the lower ends of the rake teeth to function in their normal manner;

Figure 2 is a similar view but showing the rake head elevated and the cleaning attachment in the position to which it moves when the rake head is lifted;

Figure 3 is a plan view of the rake head and attachment as seen from a point above the ends of the rake teeth;

Figure 4 is a perspective view, partially broken away, of the attachment;

Figure 5 is a section on line 5—5 of Figure 3, upon a somewhat larger scale;

Figure 6 is an enlarged view, in elevation, of portion of the head of the rake, the interdental cleaning elements being illustrated in full and dotted lines to indicate the extent of travel of these elements, upon their working strokes, relative to the rake teeth; and Figure 7 is a view similar to that of Figure 2 showing the attachment with the panels disposed parallel to each other.

The interdental cleaning elements of the attachment are indicated at 10 in the drawings and from an inspection of Figures 3 and 4 it will be observed that each comprises a relatively small, flat, rectangular sheet metal part. One end of each element 10 is integral with the lower edge of the forward panel 11 of the attachment and the opposite end of each such element is integral with the lower edge of the rear panel 12 thereof. The elements 10 are relatively wide, as may be seen in Figures 3 and 6, so as to occupy much of the space between adjacent teeth of the rake. The several elements 10 may, however, move laterally slightly with respect to the teeth. The panels 11 and 12 are flat and if prolonged would intersect at an acute angle, their free edges being more widely spaced apart than the edges which are connected to the several interdental elements 10.

The forward panel 11 is provided with a slot 13 to receive the stem 14 of the head of the rake, and by means of which the rake head is connected to the handle 15. The stem 14 is, of course, rigidly connected in the usual manner to the elongated member 16 from which the several teeth 17 spring, member 16 with the associated teeth being commonly designated the rake head. Securing elements 18, passing through aligned apertures in the panels 11 and 12, respectively, bridge across these panels above member 16 and thus limit the movement of the attachment with respect to the head in a direction parallel to and toward the points of the teeth. Movement of the attachment in the opposite direction is halted when stem 14 contacts with the end of slot 13 in panel 11. There are several apertures in each of the panels 11 and 12 and each such aperture is aligned with one in the adjacent panel so that the attachment is adjustably mounted upon the head and may also be fitted to rake heads the teeth of which vary in length. In every case the adjustment will be such that the interdental cleaning elements 10 are disposed at all times between adjacent teeth, as indicated in Figures 5 and 6, and may not pass beyond the ends of the teeth. The securing devices 18 may be cotter pins as shown or bolts or other bridging elements, as may be convenient.

After the attachment has been placed upon the head of the rake the rake is ready for use and will be used in the usual manner in raking a lawn or garden. The attachment will be forced upwardly as the rake is drawn forwardly, the cleaning elements 10 riding over the soil, grass, or debris which is being raked. When the rake is lifted to the position shown in Figure 2 the attachment will fall to the position in which it is shown in that figure, relatively to the rake head, and any leaves, stones, sticks or other material which may have been lightly caught between the teeth will thereby be dislodged. In the event that a stone, for instance, is tightly wedged between two teeth the rake head may be vibrated rather rapidly so that the attachment acts as a hammer upon the clogging article and thus effect its ready dislodgment. Ordinarily, however, the teeth of the rake will be maintained clean by simply lifting the rake out of engagement with the lawn from time to time.

The attachment can be readily fabricated at a single stamping operation from a piece of sheet metal, a strip midway between its edges having a series of spaced squares struck out, leaving the interdental cleaning elements 10. The panels 11 and 12 may then be bent relatively to the plane of the cleaning elements. The slot 13 and the several rows of apertures 20, which are adapted to receive the securing devices 18, may be formed during the original punching operation. The upper corners of the rear panel 12 may be cut away, as at 12a, if desired. The attachment is then ready for use. It is, of course, readily removable from the rake after use and can be removed whenever desired, although it has been found that the attachment is beneficial at all times and may with advantage be permanently retained upon the rake head.

In the usual embodiment of the invention the attachment is fabricated and shaped with the forward and rear panels slightly divergent so that a series of the attachments may be nested together for convenience in storage and shipment. The attachment will operate with equal facility if the panels are parallel to each other. It is shown in Figure 7 with the panels 11' and 12' arranged in a parallel relationship, these panels being attached to the interdental elements 10', and the whole unit positioned on the rake head by means of the securing devices 18'.

It is found that a garden rake which is equipped with the attachment will clean the surface of the ground much more satisfactorily than a similar rake which is not so equipped. This is because of the action of the leading panel 11, which acts to prevent relatively small objects from passing between the tines of the rake, the elements 10 resting upon the ground and the panel 11 in effect comprising a self-adjusting imperforate pusher member. The apertures in the attachment through which the tines pass are of such dimension that either end of the attachment may freely rise, so that the attachment assumes an inclined position relatively to the head of the rake, from time to time in passing over rough ground. It will be appreciated also that the exposed edges of panels 11 and 12, immediately before and behind each tine, perform tine cleaning functions as the attachment rises and falls relatively to the head of the rake.

Having thus described the invention, what is claimed as new and desired to be secured by Letters Patent is:

1. An attachment for a rake of the type embodying an elongated head having a series of spaced parallel teeth or tines having points for contact with the ground rigid therewith and a handle extending from said head, comprising a plurality of flat tooth clearing elements arranged in spaced relationship in a rectilinear series and in a common plane and positioned between successive teeth, and in their lowest position slightly above the tooth points, generally parallel forward and rear panels, said panels being at least coextensive in length with each other and with the series of tooth clearing elements and each having its lower edge attached to all elements of that series, and one of said panels having a slot intermediate its ends and extending downwardly from one longitudinal edge for the reception of said handle.

2. An attachment for a rake of the type embodying an elongated head having a series of spaced parallel teeth or tines having points for contact with the ground rigid therewith and a handle extending from said head, comprising a plurality of flat tooth clearing elements arranged in spaced relationship in a rectilinear series and in a common plane and positioned between successive teeth, and in their lowest position slightly above the tooth points, generally parallel forward and rear panels, said panels being at least coextensive in length with each other and with the series of tooth clearing elements and each having its lower edge attached to all elements of that series, the panels being of such height as to substantially cover the teeth and interdental spaces when said attachment is in lowermost position upon the rake head, and one of said panels having a slot intermediate its ends and extending downwardly from one longitudinal edge for the reception of said handle.

3. An attachment for a rake of the type embodying an elongated head having a series of spaced parallel teeth or tines having points for contact with the ground rigid therewith and a handle extending from said head, comprising a plurality of flat tooth clearing elements arranged in spaced relationship in rectilinear series and in a common plane and positioned between successive teeth, and in their lowest position slightly above the tooth points, generally parallel forward and rear panels, said panels being at least coextensive in length with each other and with the series of tooth clearing elements and each having its lower edge attached to all elements of that series, the panels being of such height as to substantially cover the teeth and interdental spaces when said attachment is in lowermost position upon the rake head, aligned apertures in said panels adjacent the top edge, securing elements passing through said aligned apertures to bridge across the panels, and one of said panels having a slot intermediate its ends and extending downwardly from one longitudinal edge for the reception of said handle.

HASKELL SMITH RHETT.

REFERENCES CITED

The following references are of record in the file of this patent:

UNITED STATES PATENTS

| Number | Name | Date |
|---|---|---|
| 1,936,800 | Moork | Nov. 28, 1933 |